(12) United States Patent
Beraud et al.

(10) Patent No.: US 9,702,065 B2
(45) Date of Patent: Jul. 11, 2017

(54) METHOD FOR MAKING COMPOSITE PARTS HAVING AT LEAST ONE CURVED AREA

(75) Inventors: Jean-Marc Beraud, Rives (FR); Alain Bruyere, Les Avenieres (FR); Jean-Benoit Thiel, La Chapelle de la Tour (FR); Jacques Ducarre, La Tour du Pin (FR)

(73) Assignee: Hexcel Reinforcements, S.A.S., Les Avenieres (FR)

( * ) Notice: Subject to any disclaimer, the term of this patent is extended or adjusted under 35 U.S.C. 154(b) by 1182 days.

(21) Appl. No.: 12/602,726

(22) PCT Filed: Jun. 10, 2008

(86) PCT No.: PCT/FR2008/051036
§ 371 (c)(1),
(2), (4) Date: Dec. 2, 2009

(87) PCT Pub. No.: WO2008/155505
PCT Pub. Date: Dec. 24, 2008

(65) Prior Publication Data
US 2010/0173143 A1    Jul. 8, 2010

(30) Foreign Application Priority Data

Jun. 12, 2007 (FR) .................................... 07 55680
Jul. 16, 2007 (FR) .................................... 07 56503

(51) Int. Cl.
*B32B 27/12*  (2006.01)
*B62D 3/00*   (2006.01)
(Continued)

(52) U.S. Cl.
CPC ................ *D02G 3/40* (2013.01); *B29B 11/16* (2013.01); *B29C 70/382* (2013.01); *B29C 70/54* (2013.01);
(Continued)

(58) Field of Classification Search
CPC ....... B29C 70/54; B29C 70/226; B29C 70/50; B29C 70/10; B29C 70/30; B29C 70/382;
(Continued)

(56) References Cited

U.S. PATENT DOCUMENTS 5,080,851 A    1/1992  Flonc et al.
5,326,524 A *  7/1994  Rhodes, Jr. ........... B29C 53/083
                                                    264/294
(Continued)

FOREIGN PATENT DOCUMENTS

EP    0706876 A    4/1996
GB    1513829 A    6/1978
(Continued)

*Primary Examiner* — Camie Thompson
(74) *Attorney, Agent, or Firm* — W. Mark Bielawski; David J. Oldenkamp

(57) ABSTRACT

The invention relates to a method for making a composite part including an assembly of superimposed webs of reinforcement threads imbedded at least partially in a polymer matrix, said part including at least one curved area and the method comprising steps of draping or stacking plies of a composite material, characterized in that, in at least one area adjacent to a curved area, at least one draping or stacking step is carried out with a ply of composite material, that comprises a web, or twisted thread web, including at least one twisted reinforcement thread in order to at least compensate the length differences of the extreme paths of the thread on either side of the width as measured in a direction parallel to the surface of the web; the invention also relates to the composite materials thus obtained.

20 Claims, 9 Drawing Sheets

(51) Int. Cl.
*D02G 3/40* (2006.01)
*B29B 11/16* (2006.01)
*B29C 70/38* (2006.01)
*B29C 70/54* (2006.01)
*D02G 3/02* (2006.01)
*D02G 3/26* (2006.01)
*B29K 105/10* (2006.01)
*B29K 707/04* (2006.01)

(52) U.S. Cl.
CPC ............... *D02G 3/02* (2013.01); *D02G 3/26* (2013.01); *B29K 2105/10* (2013.01); *B29K 2707/04* (2013.01); *Y10T 428/249942* (2015.04); *Y10T 428/249946* (2015.04); *Y10T 428/2907* (2015.01)

(58) Field of Classification Search
CPC . B29C 70/48; D02G 3/02; D02G 3/26; D02G 3/40; B32B 38/1808; B32B 2260/023; B32B 2260/046; B32B 2262/0261; B32B 2262/0269; B32B 2262/101; B32B 2262/106; B32B 5/12; B32B 5/22; B32B 5/26; B32B 11/16; B29D 99/0003; D04H 3/04; D04H 5/10; Y10T 428/2907; Y10T 428/249942; Y10T 428/249946; B29K 2105/10; B29K 2720/04; B29L 2031/003; B29B 11/16
USPC ............... 428/299.4, 298.1, 80, 81; 264/258
See application file for complete search history.

(56) References Cited

U.S. PATENT DOCUMENTS

| | | | | |
|---|---|---|---|---|
| 5,518,814 | A | * | 5/1996 | Bonigk ..................... 428/365 |
| 2006/0249868 | A1 | * | 11/2006 | Brown ................. B29C 70/342 |
| | | | | 264/163 |
| 2007/0023139 | A1 | * | 2/2007 | Bruyere et al. ............. 156/297 |

FOREIGN PATENT DOCUMENTS

| | | |
|---|---|---|
| JP | H01-235612 A | 9/1989 |
| JP | H04-261810 A | 9/1992 |
| WO | 2005/123500 A | 12/2005 |

* cited by examiner

Angle (°)
Masse surfacique = surface density
Diamètre extérieur = outside diameter Orientation (°)
Disque = disc Angle (°)  Masse surfacique = surface density
Diamètre extérieur = outside diameter    Disque = disc

[left side] Ball joint at head of assembly
Holding jaw
Pivot connection between the holding jaw and the connection to the frame
[left side] Sample
Pivot connection between the sample and the load axis of the Z.O
Frame

METHOD FOR MAKING COMPOSITE PARTS HAVING AT LEAST ONE CURVED AREA

The present invention relates to the technical field of composite parts. The subject of the invention is a method for making a composite part comprising an assembly of superimposed webs of reinforcement threads embedded at least partially within a polymer matrix, said part having at least one curved area. Notably, the invention is applied in the field of composite parts used in the automobile, aviation or naval industries.

The fabrication of composite parts or articles, that is, containing on one hand one or more fiber reinforcements or webs and, on the other hand, a matrix of a typically thermoplastic, thermosetting resin or a mixture of the two, can for instance be obtained by a process called "direct" or by a process called "indirect." A direct process is defined by the fact that one or more fiber reinforcements are prepared in a "dry" state (that is, without the final matrix), the typically thermoplastic or thermosetting resin or matrix, or a mixture of the two, being prepared separately, for instance by injection into the mold containing the fiber reinforcements ("RTM" process, for Resin Transfer Molding), by infusion (into a mold, through the thickness of the fiber reinforcements: "LRI" process, for Liquid Resin Infusion, or "RFI" process, for Resin Film Infusion), or else by manual coating/impregnation with a roller or brush on each of the unit layers of fiber reinforcement, applied successively on the mold. An indirect process is defined by the fact that the fibers and the resin are first associated before being prepared and the prepared fiber reinforcements are called preimpregnated.

For the RTM, LRI or RFI processes, it is generally first necessary to build a fibrous preform in the form of the wanted finished product, then to impregnate the preform with a thermoplastic or thermosetting resin, or a mixture of the two. The resin is injected or infused by pressure differential then thermocompressed to harden it after polymerization. In the fiber reinforcements adapted to direct processes, the reinforcement threads are generally joined to confer a unitary character to the part, then called a preform, by adhesion with a polymeric binder whose weight percentage with respect to the total weight of the fiber reinforcement (that is, reinforcement threads+polymeric binder) varies from 0.1% to 25%, and advantageously from 3% to 10%. In the case of preimpregnates adapted to indirect processes, the binder itself represents 20% to 60%, preferably 30% to 40% of the total weight of fiber reinforcement (that is, reinforcement threads+polymeric binder).

The composite parts used in the automobile, aviation or naval industries are particularly subject to very strict requirements of mechanical properties.

For applications in the fields of aviation, aerospace, and automobiles, notably, preforms are sometimes necessary, at least one part of which are intended to form the contour of an opening, typically annular or ellipsoidal, for instance, as in the case of chassis, nozzles, jet inlets, or any type of reinforcement element intended to be placed around an opening or serve as reinforcement for punched-out parts, such as bores, reinforcement elements for straps, door corner frames, porthole or windshield frames, manholes, etc.

Such parts are traditionally obtained by draping or stacking plies, which may traditionally comprise webs of threads arranged in a unidirectional or multiaxial manner or forming a fabric, wherein the threads may be associated within a web by a sewing thread or a polymeric binder, notably in the form of a powder, a film, a veil or a hot-melt binder thread. Each ply, for example, can be obtained by depositing threads on a deposition surface.

In the field of composites, threads comprise an assembly of filaments extending essentially parallel to each other. The threads thus have a certain width. Depending on the final part desired, a web or ply may be desired in which the threads take curved paths, for example, spiral, ellipsoidal, or a path covering at least two principal directions that form an angle with each other different from 00 or 180° and joined to one another by a portion of an arc of a circle. Also, the inventors have indicated that in this case notably, when, on the deposition surface, which may be plane or not plane, the threads follow non-rectilinear paths, and notably curved paths, undulations are observed, leading to a non-homogeneous deposit. The inventors have demonstrated that these undulations were due to the fact that the filaments located at the two extreme paths of the thread had to follow paths of different lengths. The extreme paths designate the two paths followed by the thread on both sides of its width (that is, at the external edges), measured parallel to its deposition surface.

FIG. 1 illustrates this phenomenon in the case of a thread deposited on a plane surface following a path along the arc of a circle. Thread F has a width I measured parallel to the deposition surface. The path T followed by the middle fiber (or median filament) of the thread F is a portion of an arc of a circle with a radius R over an angle $\Theta$. It therefore appears that the length of the path that the thread must follow is not the same over its entire width I, with the extreme paths $T_1$ and $T_2$ having different lengths.

Indeed, outside the arc of a circle, the path $T_2$, called external or maximal, is an arc of a circle with a radius $R_2$ and inside the arc of a circle, the path $T_1$, called internal or minimal, is an arc of a circle with a radius $R_1$. The path $T_1$ thus has a length $L_1$ equal to $\Theta R_1$ and the path $T_2$ a length $L_2$ equal to $\Theta R_2$, $L_2$ being greater than $L_1$. Therefore, at the internal path $T_1$, the filaments, which have no elasticity, have a length $L_1$, which is in fact equal to the length $L_2$, greater than their path, leading to an undulation phenomenon due to the presence of lengths of filaments outside of or in the deposition plane. Such irregularities are likely to show premature weak points under mechanical stress and thus lead to a reduced mechanical performance of the part obtained.

In this context, the invention proposes to provide a fabrication process for composite parts making it possible to eliminate these disadvantages. Thus the invention relates to a method for making a composite part comprising an assembly of superimposed webs of reinforcement threads included at least partially in a polymer matrix, said part having at least one curved area, a process in which steps of draping or stacking plies are taken, characterized in that, in at least one region adjacent to a curved area, at least one draping or stacking step is carried out with a ply of composite material that comprises a web, called "web of twisted threads," composed of at least one twisted reinforcement thread in order to at least compensate for the length differences of the extreme paths of the thread on either side of the width as measured in a direction parallel to the surface of the web.

According to one particular implementation of the invention, the curved area corresponds to a curved edge of the part and the twisted threads in the web of twisted threads extend along a path essentially parallel to the curved edge.

"Edge" means both an outside edge, located at an end of the part, and an inside edge defining an opening or punched-out area within the part.

Continuing the description, a ply comprising twisted threads joined within the ply by a resin or polymeric binder and positioned at the curved area or curved edge is called a "web of twisted threads." "Twisted reinforcement thread" means a thread to which twist has been applied, that is, rotation relative to the outside edges of the thread, around its middle fiber, such that the outside edges describe a helical path, that is, that the path at each point forms an essentially constant angle with a given direction. Inside a "web of twisted threads," each thread is twisted individually. Thus, when the thread follows a path having at least one curved area on the surface of the ply (which may be plane or non-plane), the twist applied to the thread makes it possible to compensate for the fact that the two extreme paths of the thread have different lengths. The extreme paths designate the two paths that the thread follows on both sides of its width, measured parallel to the surface of the web. On the curved area, the axis of rotation of the path of a thread on the surface of the web is normal to the plane tangent to the surface of the web. The application of such a twist makes it possible to prevent the undulations observed with the deposition of a non-twisted thread at the scale of the filaments composing the thread or each thread, when the "web of twisted threads" is created by means of several threads. Advantageously, the "web of twisted threads" comprises a single thread with a twist essentially identical along its entire length or a group of threads twisted individually and having an essentially identical twist among themselves and over their entire length.

"Web of threads" means a group of threads extending essentially parallel to a surface. As a non-limiting example, in a web of threads, the threads may, for example, all lie in the same direction, parallel to one another and thus form a unidirectional web. The threads may also extend in at least two directions, for example, one orthogonally with respect to the other, and thus form a multiaxial web. The threads may also be arranged so as to form a fabric, or also a web of twisted threads as defined in the context of the invention.

A ply consists of a web of threads in which the threads may possibly be joined within the web by sewing or by adhesion, using a polymeric binder, notably in the form of a powder, a film, a veil or a hot-melt binder thread.

The following description, with reference to the appended figures, makes it possible to better understand the invention:

Figure 1:
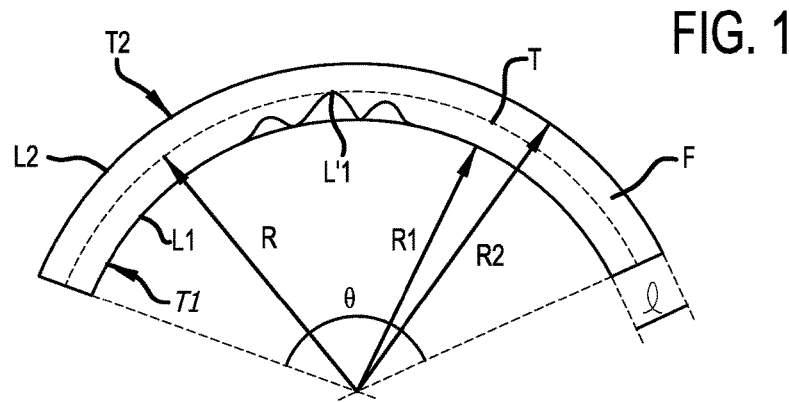
FIG. 1 shows a schematic of the undulation phenomenon observed in the case of the deposition of a non-twisted thread on a surface, along a path on a deposition surface, said path having at least one curved area on the deposition surface.
Figure 2A:
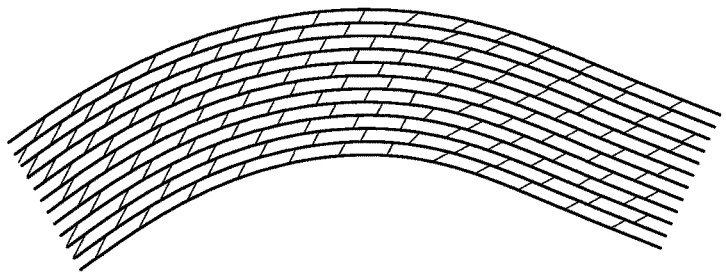
FIG. 2A represents a photograph of a similar ply in the case of non-twisted threads.
Figure 2B:
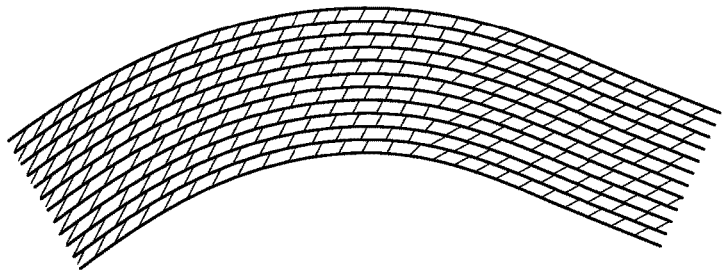
FIG. 2B represents a photograph of a web of twisted threads.

In the "web of twisted threads," the thread is twisted so as to at least compensate for the differences in length of the extreme thread paths on either side of its width, measured parallel to the surface of the web. At the curved area, the thread or threads of the twisted thread web will show a curved path with, for each thread, extreme thread paths on both sides of its width that have different lengths. This curved path is included in a plane defined by the threads that are adjacent to it. Notably, in the case of an essentially plane part, the ply of the "web of twisted threads" may be positioned at the region adjacent to a curved area so as to extend in a plane perpendicular to the curved edge. Thus the twist applied to the threads in the "web of twisted threads" makes it possible to avoid the undulations due to the overlengths that would normally be found in the absence of twisting. In the context of the invention, the application of twist makes it possible to avoid the undulations found with the deposition of non-twisted threads. FIG. 2 shows two representations of photographs: FIG. 2A represents a ply obtained by the deposition of non-twisted threads, while FIG. 2B represents a ply obtained by the deposition of twisted threads. In the second case, the ply obtained is more homogeneous and without undulation since twisting makes it possible to obtain a length homogeneity of the filaments inside the thread.

Indeed, a thread is generally composed of a group of threads or filaments and generally comprises 3,000 to 80,000 filaments in the case of carbon threads, and advantageously 12,000 to 24,000 filaments. The reinforcement threads used in the context of the invention are preferably of a material selected among carbon, ceramics, glasses, silicas, basalts or aramids, or any other material used in the field of composite materials with fibers that can be natural or synthetic. Nevertheless, carbon is particularly preferred. The usable ceramics are silicon carbide and refractory oxides, such as for example, alumina and zirconia. Particularly preferred for use in the context of the invention are carbon threads of 3 to 24K. The constituent fibers may be discontinuous, split, or preferably continuous. The threads used generally have an essentially circular transverse cross-section (called round threads) or, preferably, are essentially parallelepiped or elliptical (called flat threads). These threads have a certain width and thickness. As an example, a flat 3K carbon thread with a count of 200 tex before application of the twist, generally has a width of 1 to 3 mm; a flat 12K carbon thread with a count of 446 tex, a width of 2 to 5 mm; a flat 12K carbon thread with a count of 800 tex, a width between 3 and 7 mm; a flat 24K carbon thread with a count of 1600 tex, a width of 5 to 12 mm; and a flat 24K carbon thread with a count of 1040 tex, a width of 5 to 10 mm. A flat carbon thread of 3,000 to 24,000 filaments will therefore most often have a width of 1 mm to 12 mm. Among the carbon threads are the High Resistance (tHR) threads whose tension modulus is between 220 and 241 GPa and whose tension stress rupture is between 3450 and 4830 MPa, the Intermediate Modulus (IM) threads whose tension modulus is between 290 and 297 GPa and whose tension stress rupture is between 3450 and 6200 MPa, and the of High Modulus threads (HM) whose tension modulus is between 345 and 448 GPa and whose tension stress rupture ranges between 3450 and 5520 Pa (from the *ASM Handbook*, ISBN 0-87170-703-9, ASM International 2001).

Such a result, that is, the absence of undulation inside the "web of twisted threads," may be achieved, for example, by using a web of twisted threads in which the reinforcement thread or threads have a twist of 5 to 100 t/m, preferably from 10 to 80 t/m.

According to a first variant of the implementation, the "web of twisted threads" can be obtained with at least one 3K carbon thread of 200 tex having a twist of 10 to 70 t/m, preferably from 15 to 40 t/m, notably when the minimal internal radius of the thread path falls within the range of 10 to 500 mm.

According to another variant of the implementation, the "web of twisted threads" can be obtained with at least one 6K carbon thread of 223 tex having a twist of 15 to 80 t/m, preferably from 50 to 70 t/m, notably when the minimal internal radius of the thread path falls within the range going from 10 mm to 500 mm.

According to yet another variant of the implementation, the "web of twisted threads" can be obtained with at least one 6K carbon thread of 400 tex having a twist of 15 to 80 t/m, preferably from 40 to 60 t/m, notably when the minimal internal radius of the thread path falls within the range of 10 to 500 mm.

According to yet another variant of the implementation, the "web of twisted threads" can be obtained with at least one 12K carbon thread of 446 tex having a twist of 10 to 80 t/m, preferably from 10 to 60 t/m is deposited, notably when the minimal internal radius of the thread path falls within the range of 10 to 500 mm. For a minimal internal diameter less than 50 mm, greater than 40 t/m, and notably less than or equal to 60 t/m is preferably applied. For a minimal internal diameter greater than 50 mm, a twist less than or equal to 40 t/m, notably from 10 to 40 t/m, is preferably applied.

According to yet another variant of the implementation, the "web of twisted threads" can be obtained with at least one 24 K carbon thread of 1040 tex having a twist of 10 to 40 t/m, preferably from 10 to 25 t/m, notably when the minimal internal radius of the thread path falls within the range of 20 to 150 mm. In particular, when the minimal internal radius of the thread path ranges from 20 mm to 40 mm, the twist will be greater than 20 t/m and when the internal radius is greater than 40 mm, the twist can be less than or equal to 20 t/m.

According to another particular mode of implementation, the "web of twisted threads" may be made from a single or a number of reinforcement threads having an S or Z twist, preferably S when the deposition is performed at the creation of the "web of twisted threads" on the curved area of the path of the thread or threads, in a clockwise direction. For definitions of what is meant by an S or Z twist, see *Handbook of Weaving*, pp. 16-17, by Sabit Adanur, Professor, Department of Textile Engineering, Auburn, USA, ISBN 1-58716-013-7.

In the preferred implementation modes of the invention, the plies comprise reinforcement threads in a material selected from among the following materials: carbon, glass, aramid, silica, ceramic, basalt and mixtures thereof.

In other preferred implementation modes of the invention, the plies are composed of at least one reinforcement thread forming a web, and the consistent nature of each ply can be directly assured by the positioning of the threads in the case of a fabric or in the case of a unidirectional or multiaxial by sewing or by adhesion with a polymeric binder, selected from among thermosetting polymers, thermoplastic polymers and mixtures of said polymers, possibly in the form of a powder or a self-adhesive resin or hot-melt. In the case of plies of web of twisted threads, the threads are associated together in the web with a polymeric binder that acts by adhesion.

According to an implementation of the invention, the assembly of plies has a weight percentage of polymeric binder relative to the total weight of the plies (that is, reinforcement threads+polymeric binder) ranging from 0.1 to 25%, and advantageously 3 to 10%.

According to another implementation of the invention, the assembly of plies has a weight percentage of polymeric binder relative to the total weight of the plies (that is, reinforcement threads+polymeric binder) ranging from 20 to 60%, and advantageously 30 to 40%.

These percentages are given for the total assembly of plies, with the possibility of course for each ply to have a different ratio of polymeric binder. Nevertheless, advantageously, the percentage of binder that each ply contains will be relatively homogeneous.

According to a variant implementation of the invention, the process according to the invention is used to make a composite part comprising a curved edge that defines an opening and includes at least one draping or stacking step, on at least one area adjacent to this curved edge, of at least one ply of a composite material, comprising a web, called "web of twisted threads," composed of at least one twisted reinforcement thread extending in a path essentially parallel to the curved edge.

To obtain such pieces notably, the "web of twisted threads" is composed, for example, of a single twisted thread deposited edge to edge along paths essentially parallel to one another or of a group of twisted threads extending essentially parallel to one another and joined together.

According to a particular implementation, the "web of twisted threads" is composed of a spiral of twisted threads, each turn being joined to the next.

In particular, the "web of twisted threads" is composed of a single twisted thread deposited edge to edge along paths essentially parallel to one another (except for bunching points) or of a group of twisted threads extending essentially parallel to one another and joined together.

Depending on the possibilities allowed by the grammage, the count and the twist of the thread being used, the threads are positioned to minimize and even prevent gaps between two adjacent threads. An example of such an implementation in which the ply takes the shape of a curved ribbon is, schematically illustrated for instance in FIG. 3. According to an example of implementation, a thread is deposited in such a way as to form a spiral of twisted threads, each winding being deposited edge to edge with the next. An example of such an implementation in which the ply takes the shape of a disc is schematically illustrated for instance in FIG. 4. Such "twisted webs" can be obtained by depositing twisted threads on a non-plane surface, or preferably on a plane surface, when the composite piece to be made has an essentially plane surface.

In the context of the invention, the process comprises steps in which other plies are stacked or draped, for example, plies of unidirectional webs, of multiaxial and/or of fabrics. These plies are cut so as to have the desired shape, notably at the area or at the curved edge of the part. The ply of "web of twisted threads" can be alternated with another ply, or a ply of "web of twisted threads" can be inserted between an assembly of two, three, four or more other plies. At the curved area, one or more plies of "web of twisted threads" can be stacked or draped. The ply or plies of "web of twisted threads" can be positioned locally, that is only in the proximity of an area adjacent to a curved edge, or, it may extend over the entire length of the part.

Figure 5:
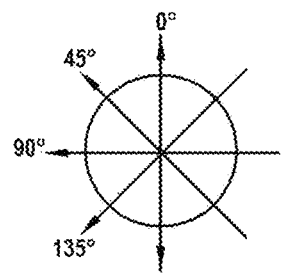
FIG. 5 represents the reference point used to determine the orientation of the threads within a part, with 0° located along the principal axis of the part.

Advantageously, the steps of stacking or draping plies of unidirectional webs or of fabrics are performed by orienting the web threads so as to obtain weight percentages of fibers within the plies of the composite part other than the "web of twisted threads" plies, oriented in directions forming an angle of 0°, 45° and 135° (with isoproportion of 45° and 135°), and 90° with the principal axis of the part, of 25/50/25, 40/40/20, 50/40/10 or 10/80/10. The principal axis of the part is generally the largest axis of the part. The 0° coincides with this axis and the 45°, 35° and 90° angles are represented in FIG. 5. In most cases, the percentage corresponding to the 45° and 35° orientations is equally distributed between the two orientations. The choice of the 40/40/20, 50/40/10 orientations makes it possible to optimize the performance of the part obtained depending on the stress to which the part is subject and the desired gain in weight. With a 25/50/25 orientation, the part obtained, whether by a direct or indirect process, is quasi-isotropic and no direction is privileged. The 40/40/20 orientation will be mainly used with plies of preimpregnated unidirectional webs, for example, of 134 g/m$^2$, 194 g/m$^2$ or 268 g/m$^2$, to obtain parts by an indirect process. The 50/40/10 orientation will be mainly used with multiaxial or fabric plies to obtain parts by a direct or indirect process. The 50/40/10 draping can also be used for webs having a grammage equal to or less than 220 g/m$^2$. The 10/80/10 orientation results in strongly oriented parts and will, for example, be used for applications like joists or girders, which are subject to strong twist loads.

The process according to the invention may be used to make all types of reinforcement elements designed to be placed at the edge of an opening or that serve to reinforce punched out areas, parts requiring curved local reinforcement, or parts that include an opening requiring curved local reinforcement, such as framing reinforcement elements for door corners, trap doors, manholes or access doors, porthole frames or windshield frames, connecting rod bearings, rod links, assembly bores, attachment parts or parts comprising any other load-bearing area, such as an attachment area.

The subject of the present invention is also composite parts susceptible of being obtained by the process according to the invention.

In particular, the invention also concerns a composite part comprising an assembly of webs of superimposed reinforcement threads embedded at least partially in a polymer matrix, said part having at least one curved area, characterized in that at least one area adjacent to a curved area includes a web, called "web of twisted threads," composed of at least one twisted reinforcement thread.

Figure 6:
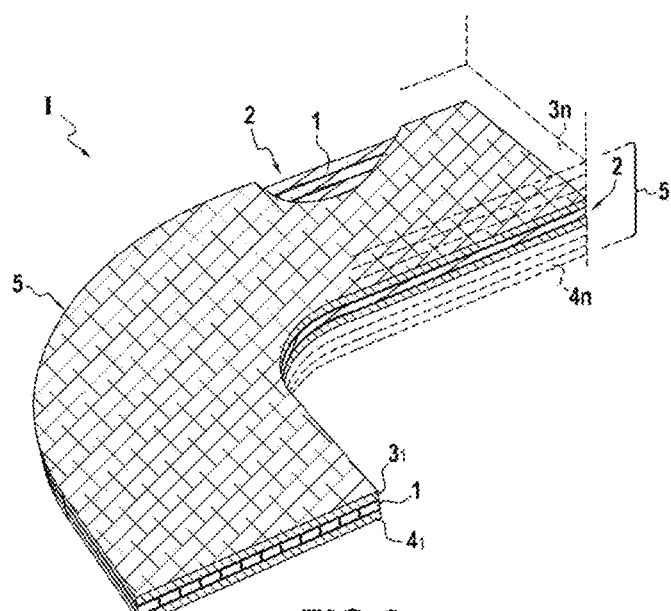
FIG. 6 represents a part obtained by stacking plies.

According to a particular implementation, the curved area corresponds to a curved edge of the part and the twisted threads in the web of twisted threads extend along a path essentially parallel to the curved edge. Such a mode of implementation is illustrated for example in FIG. 6. An outside edge 1 of the "web of twisted threads" 2 constitutes, with the outside edges $3_1$ to $3_n$ of the other webs $4_1$ to $4_n$ on which it is stacked, the curved edge 5 of the part I. Notably, in the case of an essentially plane part, the "web of twisted threads" is positioned so as to extend in an essentially perpendicular plane to the curved edge. The "web of twisted threads" or webs can be positioned locally, that is only in the proximity of a region adjacent to a curved area or edge of the part, as in the case of example 3a) which will be described below, or it may even extend over the entire surface of the part.

Advantageously, each "web of twisted threads" is composed of one single and unique thread or group of threads that essentially all have the same composition, length and twist. All variants described as above for the process according to the invention, apply mutatis mutandi to the composite parts according to the invention.

First the composition of a ply of "web of twisted threads" will be explained in detail. In the context of the invention, to create a ply of "web of twisted threads," a predetermined twist is applied to the thread before it is deposited. Said twist may, for example, be obtained by means of a twisting device. In theory, to avoid filament overlengths, it would be sufficient to apply a twist of 1 turn to be distributed along the length of the path on which the thread has different extreme paths (which correspond to the paths of the outside edges of the thread). In practice, the adhesion of the thread and reorganization of the filaments within the thread when it is deposited, make it possible to apply a twist different from one turn per path length. As an example, a twist of 5 to 100 t/m, preferably from 10 to 80 t/m, can be applied.

As a more specific example, in the case of a 3K carbon thread with a count of 200 tex, a twist of 10 to 70 t/m, preferably of 15 to 40 t/m, will be applied; in the case of a 6K carbon thread of 223 tex, a twist of 15 to 80 t/m, preferably of 50 to 70 t/m, will be applied, in the case of a 6K carbon thread of 400 tex, a twist of 15 to 80 t/m, preferably of 40 to 60 t/m, will be applied, in the case of a 12K carbon thread of 446 tex, a twist of 10 to 80 t/m, preferably of 10 to 60 t/m, will be applied, and in the case of a 24K carbon thread of 1040 tex, a twist of 10 to 40 t/m, preferably of 10 to 25 t/m, will be applied.

The width and the count of the thread correspond either to the measured average width of the thread or to the supplier data. The minimal radius of the internal path of the thread is determined as follows. Along the entire path of the thread and for each area in which the path on the deposition surface is not rectilinear, the radius of the internal path $T_1$ of the thread is calculated and the smallest radius obtained for the set of those areas is taken. When a group of threads parallel to each other is deposited simultaneously or successively, a single and identical twist will be preferably applied to each thread.

The twist applied will be adjusted by a person skilled in the art depending on the minimal internal radius (smallest radius taken by the inside edges of the thread) and on the maximal external radius (largest radius taken by the outside edges of the thread) of the thread or threads of the entire "web of twisted threads" assembly to be created, on the spaces left open between two consecutive threads, as well as on the count of the thread and of the desired carbon surface density. Preferably, sufficient twist will be applied to minimize or even totally prevent undulations, but the least amount possible in order to optimize the mechanical performance of the material obtained.

Preferably, the "web of twisted threads" is obtained with a minimum of threads required to minimize the hold points. When several threads are deposited parallel to each other, simultaneously or successively, the same twist will preferably be applied individually to all threads comprising the "web of twisted threads." To determine the twist to be applied, the necessary twist will preferably be applied to the assembly of threads to obtain a satisfactory deposit on the path of the thread with the minimal internal radius of curvature, this twist being necessarily sufficient to obtain a deposit without undulation in the portions of the path where the thread (or the other threads) has a larger internal radius of curvature. Particular attention will be paid to the absence of open space between the threads, and notably, to the areas close to their maximal external radius.

When a ply of "web of twisted threads" is created, the thread or threads are deposited on a deposition surface. The bond of the threads on the deposition surface is achieved by adhesion, using a polymeric binder. No bond is created by sewing or knitting. Polymeric binder means a polymer composition containing a polymer or a mixture of polymers, notably, a thermoplastic polymer or a thermosetting system comprising or not a hardener and/or an accelerator. The polymeric binder can be used either in an amount just sufficient to bind the threads to the surface on which they are deposited, or in an amount sufficient to also serve as matrix in the final composite part: the binder then represents from 20 to 60%, preferably from 30 to 40% of the total weight of the fiber reinforcement (that is, reinforcement threads+ polymeric binder). The polymeric binder can notably take the form of a powder, a film, a veil or a thread of bonding hot-melt.

The ply may be obtained directly with the percentage of binder desired, or before draping or stacking it may undergo an intermediate impregnation step to obtain the desired percentage, according to a temperature and pressure cycle that depends on the nature of the thermosetting or thermoplastic resin or of the mixture of the two being used, and known to a person skilled in the art. It is also possible in some cases, notably in the case of the use of a veil or a film, even if the amount of polymeric binder corresponds to the final desired amount, to perform an intermediate heat treatment step so as to impregnate the threads.

According to a preferred implementation of a "web of twisted threads" used in the context of the invention, the threads can be dry before deposition, that is, neither impregnated, nor coated, nor associated with any polymeric binder before entering the twisting devices, nor, preferably, before being deposited. Indeed, advantageously, so as to better control the deposition of the thread, the latter will be applied on a dry thread. Also, the twisted thread is essentially composed of fibers or filaments which represent at least 98% of its weight, the weight percentage of standard lubrication representing at most 2% of the weight of the thread. In this case, the polymeric binder is, for instance, applied on the deposition surface, either upstream of the deposition, or as the deposition proceeds. The deposition surface can therefore be covered with a film, a veil or a polymeric binder powder.

According to a preferred implementation of a ply of "web of twisted threads," the polymeric binder used is a thermoplastic powder or a thermosetting powder, or else a mixture of the two. Among the usable thermoplastic powders, as non-limiting examples, can be cited the powders of polyolefin, polyamide, polyether sulfone (PES), phenylene polysulphide (PPS), polyetheretherketone (PEEK), or polyether imide (PEI), while among the thermosetting powders, the powders of epoxide polymers with or without a hardening agent, the phenolic powders, the polyester powders can be cited as non-limiting examples. In these cases, the process stipulates that heat be applied to the deposition area of the reinforcement thread. This heat may be applied either at the point of deposition of the reinforcement thread with a resistance heater integrated in the thread deposition device, or by means of a heat radiation source directed toward the area of deposition of the reinforcement thread.

For creating a ply of "web of twisted threads," a temporary support surface can also be implemented beforehand, covered at least in part by a polymeric binder selected from among the thermoplastic and thermosetting powders, possibly as a mix, the self-adhesives or hot-melt adhesives, the thermoplastic and thermosetting veils, possibly as a mix, requiring heat activation.

To create a ply of "web of twisted threads," it is equally possible to apply as a polymeric binder an adhesive of the same chemical nature as the powders above, used in the molten form, called "hot-melt." This hot-melt resin is then deposited on the deposition support, either during the deposition process of the reinforcement thread and upstream of the deposition of the reinforcement thread, or during a previous step.

According to another mode of implementation, to create a ply of "web of twisted threads," a solution or a pulverizable emulsion of at least one adhesive resin is used as polymeric binder, such as for instance but not limited to, a polyacrylic, polyvinyl or polyurethane resin.

According to another mode of implementation, nonetheless not preferred, for creating a ply of "web of twisted threads," it is possible to associate the thread with the polymeric binder upstream of its deposition. This can be achieved by using a thermoplastic thread covering the reinforcement thread which is then heated at its point of deposition. The thermoplastic thread can be of any appropriate type and, for instance but not exclusively, comprise a thread of polyamide, polyolefin, polyether sulfone (PES), polyetheretherketone (PEEK), poly(phenylene sulfide) (PPS), or polyether imide (PEI). It is equally possible to use a polymeric binder, closely bound to the reinforcement thread to form a hybrid reinforcement thread. It is thus possible to use as a polymeric binder, filaments of thermoplastic or thermosetting materials in the phenoxyl family for instance, of the same nature as the thermoplastic threads above, which will be mixed with filaments of reinforcement material, a mixture that will be spun to form a hybrid reinforcement thread.

Figure 3:
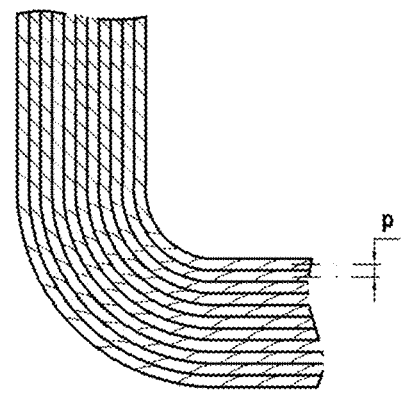
FIGS. 3 and 4 represent top views of plies of a web of twisted threads.

When a ply of "web of twisted threads" is created, the reinforcement thread is preferably deposited continuously or, on the contrary, in discontinuous segments. It is advantageous, for instance in case of a spiral thread deposition, to deposit the thread continuously on the maximal length of the thread, so as to minimize, and even avoid the cutting points. According to an example of implementation, a thread is deposited so as to form a spiral of twisted threads, each winding being deposited edge to edge with the next. An example of such an implementation in which the "web of twisted threads" takes the shape of a disc is schematically illustrated for instance in FIG. 4. In the case of an implementation of a "web of twisted threads" with one rectilinear portion and one portion known as a corner portion, in the form of a curved ribbon, where the threads are deposited along a portion of an arc of a circle as shown in FIG. 2B or 3, it can be useful to deposit simultaneously a group of parallel threads, so as to cover in a single step the width of the desired "web of twisted threads."

In order to be able to give the thread the desired path with precision when creating a "web of twisted threads," and so that the path can be retained after deposition, the thread will be fed without tension or with a minimum of tension up to the point of deposition so that it will be deposited in a resting state.

When creating a "web of twisted threads," depending on the type of reinforcement thread and the polymeric binder used, a pressure between 0.01 bar and 30 bar and preferably between 0.1 bar and 1 bar will be applied to the reinforcement thread during its deposition. Similarly, depending on the nature of the polymeric binder used and the nature of the reinforcement and more particularly, in case a thermoplastic or thermo-adhesive polymeric binder is used, the point of deposition of the reinforcement thread will be heated to a temperature between 50° C. and 450° C. and, preferably, between 50° C. and 150° C.

Creating a composite part requires draping and stacking other plies in addition to the ply or plies of the "web of twisted threads." For the other plies, notably one comprising a unidirectional or multiaxial web, the threads will also usually be joined inside each ply by sewing or even by adhesion with a polymeric binder as previously defined, in which the percentage by weight is selected depending on the direct or indirect process selected for making the final part. In the case of a ply of a fabric web, a polymeric binder is not necessary since the cohesion of the web can be assured by the fabric. If necessary, the binder can also assure that the webs are joined to one another either at the time of the intermediate creation of a preform in the case of direct processes, or by the stickiness (commonly called "tack") of the polymeric binder at ambient temperature in the case of indirect processes.

Next, if the amount of polymeric binder in the assembly of plies is not sufficient to obtain the polymer matrix (the case of a direct process), a resin or matrix of the thermoplastic, thermosetting type or a mixture of the two, is then added, for example, by injection in a mold containing the plies ("RTM" process, Resin Transfer Molding), by infusion (in a mold, through the thickness of the plies: "LRI" process, Liquid Resin Infusion, or "RFI" process, Resin Film Infusion), or else by a manual coating/impregnation with a roller or brush on each of the plies, applied successively on the mold form used. The matrix used can be of the same nature as the polymeric binder or at least compatible with it. If the different plies used are preimpregnated and contain a sufficient amount of polymeric binder to create the part, it is not necessary to add an additional polymer matrix since the polymer matrix is then obtained by the polymeric binder in the preimpregnated plies. The preimpregnated plies may be directly provided with the desired amount of polymeric binder or may first undergo draping or stacking in an intermediate impregnation step according to a temperature and pressure cycle that depends on the nature of the thermosetting resin, thermoplastic resin or mixture of the two, and known to a person skilled in the art. It is equally possible in some cases, notably in the case of the use of a veil or a film, even if the amount of polymeric binder corresponds to the final desired amount, to perform an intermediate heat treatment step so as to impregnate the threads.

The composite part is then obtained after a heat treatment step.

Finally, for thermosetting matrices, the composite part is obtained according to a traditional cycle of heat treatment of the polymers, recommended by the suppliers of the polymers, and known to a person skilled in the art. This subsequent step of heat treatment, resulting in the corresponding thermoset polymer, is traditionally used in the different prior art processes for making composite parts.

For thermoplastic polymers, the composite part is generally obtained according to a traditional cycle of consolidation of the polymers by applying a heat treatment notably at a temperature higher than the melting point recommended by the suppliers of the polymers, and known to a person skilled in the art.

The examples below illustrate the invention.

Example 1 of Implementation of a Ply of "Web of Twisted Threads"

Figure 4:
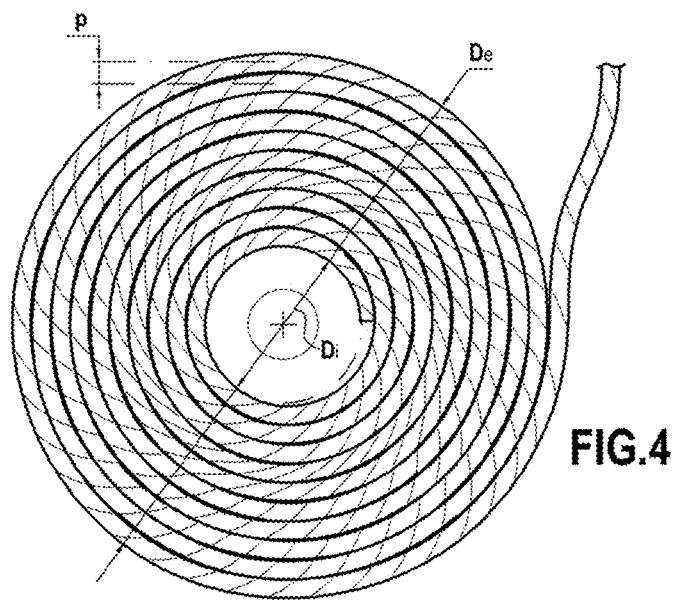
Figure 7:
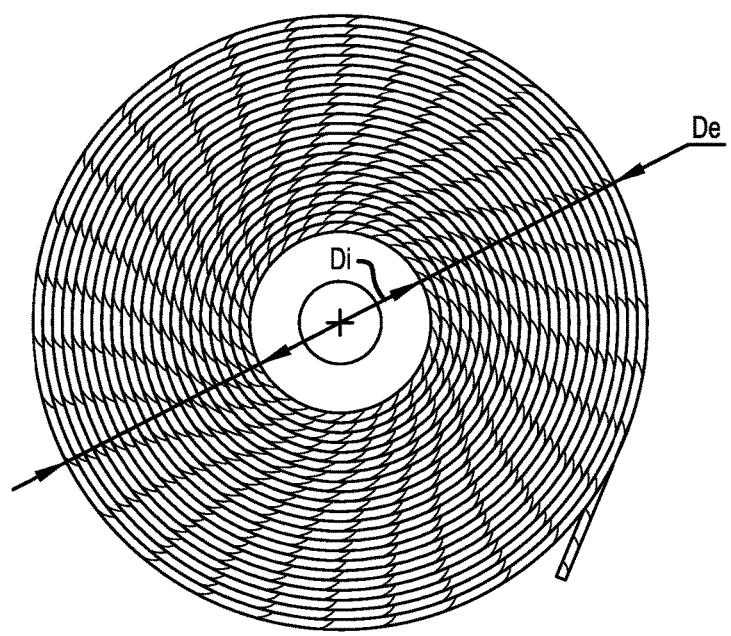
FIG. 7 represents a photograph of a ply of a web of twisted threads in the form of a disc similar to the one shown in FIG. 4.

A spiral, such as represented in the schematic in FIG. 4 or in the representation of a photo shown in FIG. 7, with an internal diameter $D_i$ of 15 mm and an external diameter $D_e$, is created by deposition of a 3K carbon thread of 200 tex (HTA 5131 from Tenax) twisted with a twist of 50 t/m. The deposition spacing p between 2 consecutive average paths is 0.98 mm. The thread is deposited according to a spiral on silicon paper powdered at 15 $g/m^2$ with an epoxy resin containing a hardener (E01 from Hexcel). The ply obtained has a thickness of 0.2 mm.

Figure 8:
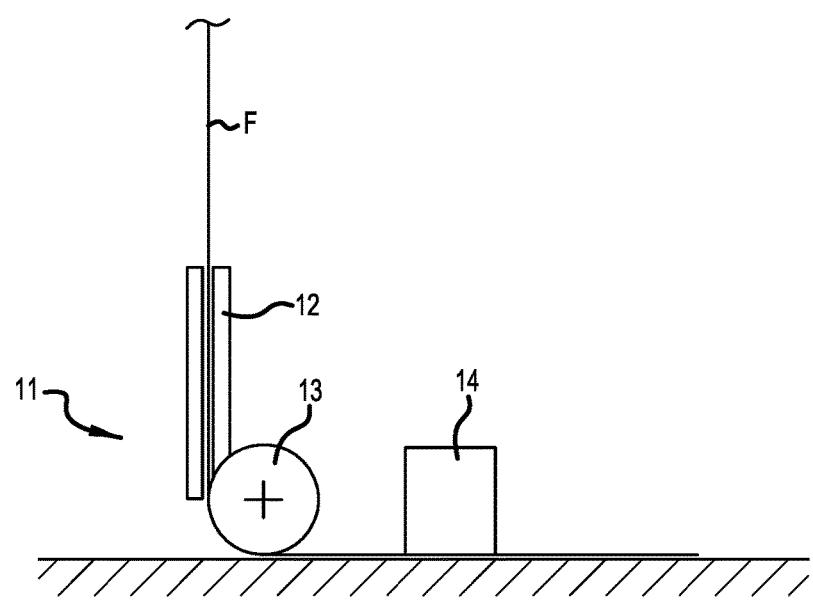
FIG. 8 represents a schematic of a deposition device for a web of twisted threads.

The device shown in FIG. 8 is prepared. The thread F is fed in, without tension at the deposition finger 11 which has an integrated resistance heater 12 at a temperature of 300° C. The thread is applied on the surface by means of an applicator roller 13 with a radius of 2 mm and with a contact pressure of 10 KPa. The feeding speed of the thread is synchronized with the advancing speed of the deposition finger, which is 20 mm/s. Upstream of the point of deposition, a cooling element 14 is placed on the thread so as to apply a pressure of 10 KPa.

Figure 17:
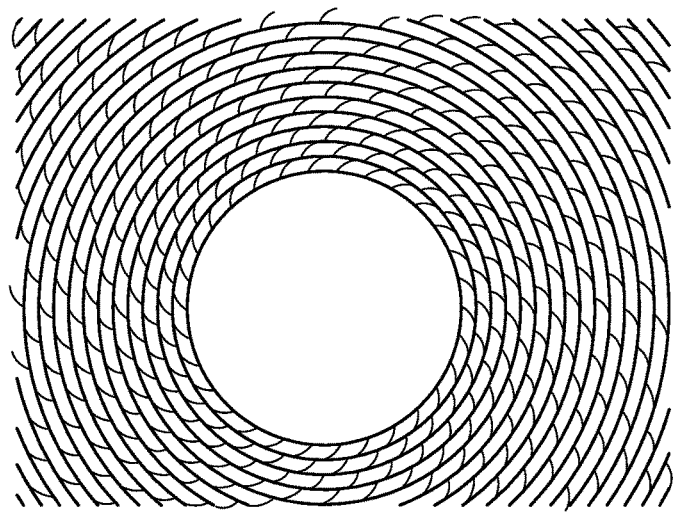
FIG. 17 represents a photograph of a ply of a web of twisted threads in the form of a disc similar to the one shown in FIG. 4.

Similarly, a spiral such as shown in the schematic in FIG. 4 and partially shown in the representation of a photograph in FIG. 17, with an internal diameter $D_i$ of 40 mm and an external diameter $D_e$, is fabricated by deposition of a 24K carbon thread of 1040 tex (T800S from Toray) twisted with a twist of 22 t/m. The deposition spacing p between 2 consecutive average paths is 3.88 mm. The thread is deposited in a spiral on an epoxy resin film (Hexply M21 from Hexcel) with a surface density of 72 $g/m^2$. The preform obtained has an average thickness of 0.25 mm.

Example 2 of Implementation of a Ply of "Web of Twisted Threads"

By using a device similar to the preceding one, allowing the simultaneous deposition of 23 threads, a ply of "web of twisted threads" for reinforcing a door corner is obtained, as illustrated in the schematic representation in FIG. 3: at a 90° angle, an arc of a circle with an internal diameter of 95 mm and an external diameter of 475 mm is made by depositing 12K carbon threads and 446 tex (IM7-6000 from Hexcel) twisted with a twist of 17 t/m. The deposition spacing, the space between the median fibers of two consecutive threads, is 1.65 mm. The deposition is made on an epoxy resin film (Hexply 8552 from Hexcel) with a surface density of 72 $g/m^2$.

The ply obtained has an average thickness of 0.25 mm.

Example 3 of Implementation of a Typical Connecting Rod Bearing

A part is fabricated according to the process of the invention and its mechanical properties are compared to three other parts obtained by other process.

a) Connecting Rod Bearing Made According to the Process of the Invention

Figure 9A:
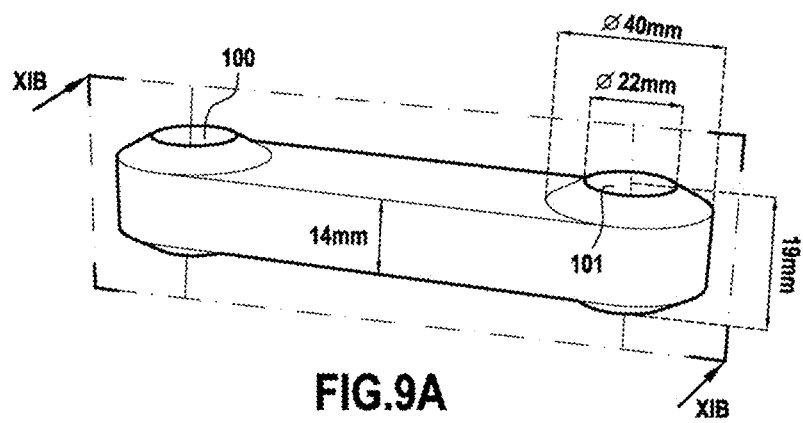
FIGS. 9A and 11 are perspective views of parts according to the invention.
Figure 9B:
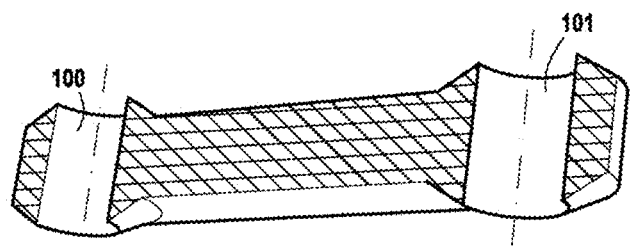
FIG. 9B is a view according to the section XIB of the part shown in FIG. 9A.

A part conforming to the part represented in FIG. 9A and FIG. 9B is made by draping plies of unidirectional web and plies of "web of twisted threads" prepared according to Example 1 at the two openings 100 and 101 so as to obtain a fiber orientation of 50/40/10.

Figure 10:
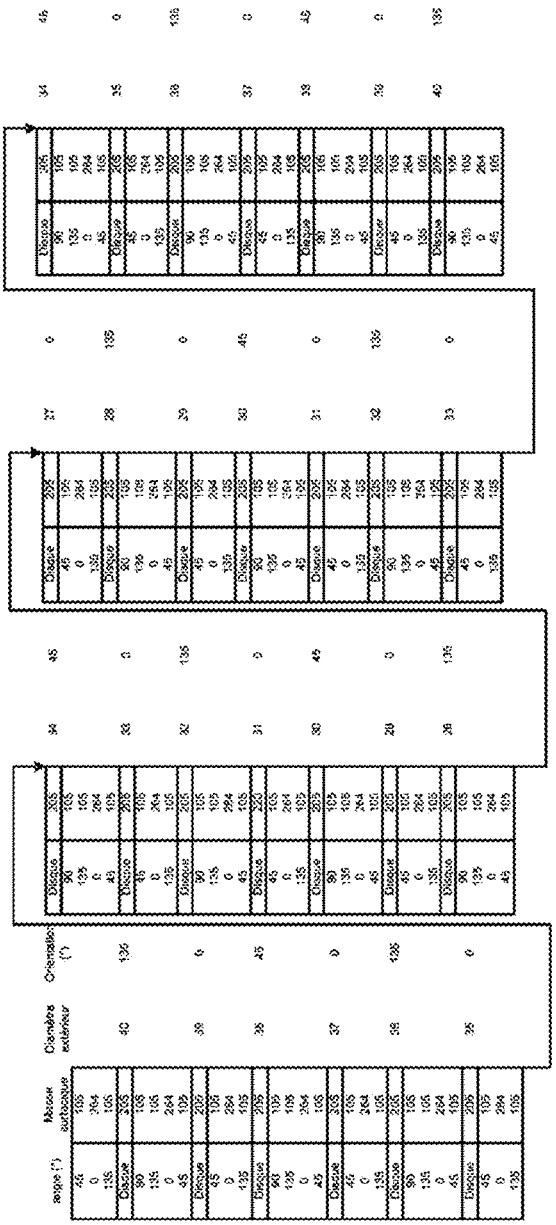
FIG. 10 shows, in tables, the changes in the external diameters of the discs, as well as the stacks created in Example 3 according to the invention.

Twenty-seven plies of twisted web are used: These plies are obtained by depositing a spiral of 205 g/m² of 3K carbon thread IHTA 5131 with an internal diameter of 22 mm and changing external diameters as shown in FIG. 10, on silicone paper powdered at 10 g/m² with an epoxy resin containing a hardener (E01, from Hexcel). The deposition is then covered with another identical silicone paper. The two papers are, of course, removed before draping.

The unidirectional webs used are made from 6K carbon thread HITA 5131, and have a surface weight of 264 g/m² or 105 g/m². On one side of the web a thermal adhesive thread from the polyester family extending transversally to the carbon threads is deposited with a spacing of 50 mm. Each surface of the carbon-thread web, thermal adhesive thread assembly is covered with an epoxy resin powder E01 (Hexcel) at a rate of 2 times 10 g/m².

These unidirectional webs are stacked according to a sequence A, corresponding to 1053 g/m², shown in Table 1 below.

TABLE 1

| (sequence A) | | |
|---|---|---|
| Angle | g/m² | |
| 45 | 105 | |
| 0 | 264 | |
| 135 | 105 | |
| 90 | 105 | A |
| 135 | 105 | |
| 0 | 264 | |
| 45 | 105 | |

Fourteen A sequences and 27 plies of "web of twisted threads" are stacked to obtain the composite part. The plies of "web of twisted threads" are inserted into the sequences A as shown in FIG. 10, which shows the stacked plies obtained.

b) Comparative Example C1

Figure 11:
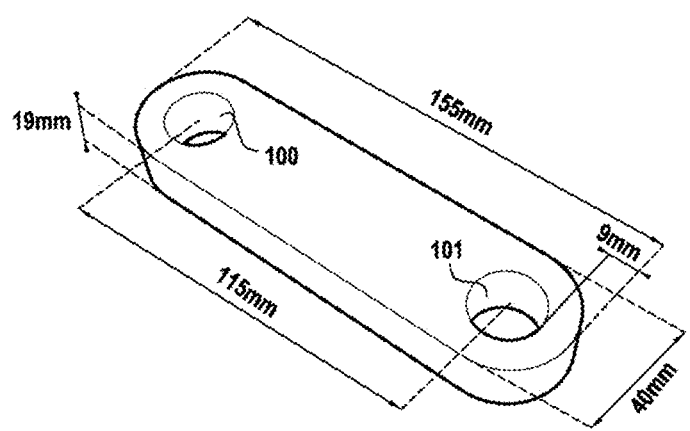

A part conforming to the part shown in FIG. 11 is obtained by draping plies of fabric so as to obtain an orientation of fibers of 50/40/10.

The plies of fabric used are as follows:

Fabric B (taffeta 205 g/m² of 3K HR carbon threads in warp and in weft powdered with Hexcel E01 10 g/m²

Fabric C (unidirectional taffeta 290 g/m² of 6K HR carbon threads in warp, glass E 34 tex in weft, powdered with Hexcel E01, 2×10 g/m²)

Table 2 below shows the different plies used.

TABLE 2

| | | Total weight g/m² | % |
|---|---|---|---|
| 0° | 28 plies of G1157 + 19 half-plies of GB201 | 10067.5 | 49.8 |
| 457135° | 40 plies of GB201 | 8200 | 40.6 |
| 90° | 19 half plies of GB201 | 1947.5 | 9.6 |

Table 3 below shows the stacking steps used to obtain the part.

TABLE 3

| Angle (°) | Fabric | | | |
|---|---|---|---|---|
| 0 | G1157 | | 0/90 | GB201 |
| 45/135 | GB201 | | | B |
| 0/90 | GB201 | B | 45/135 | GB201 |
| 45/135 | GB201 | | | B |
| 0 | G1157 | | 45/135 | GB201 |
| | | | | B |
| | | | 45/135 | GB201 |
| | | | | B |
| | | | 45/135 | GB201 |
| | | | | B |
| | | | 45/135 | GB201 |
| | | | | B |
| | | | 45/135 | GB201 |
| | | | | B |
| | | | 0/90 | GB201 |
| Symmetry | | | | | c) Comparative Example C2

A part conforming to the part shown in FIG. 11 is obtained by draping plies of unidirectional web by stacking 19 A sequences such as described at Example 3a), so as to obtain an orientation of fibers of 50/40/10.

d) Comparative Example C3

Figure 12:
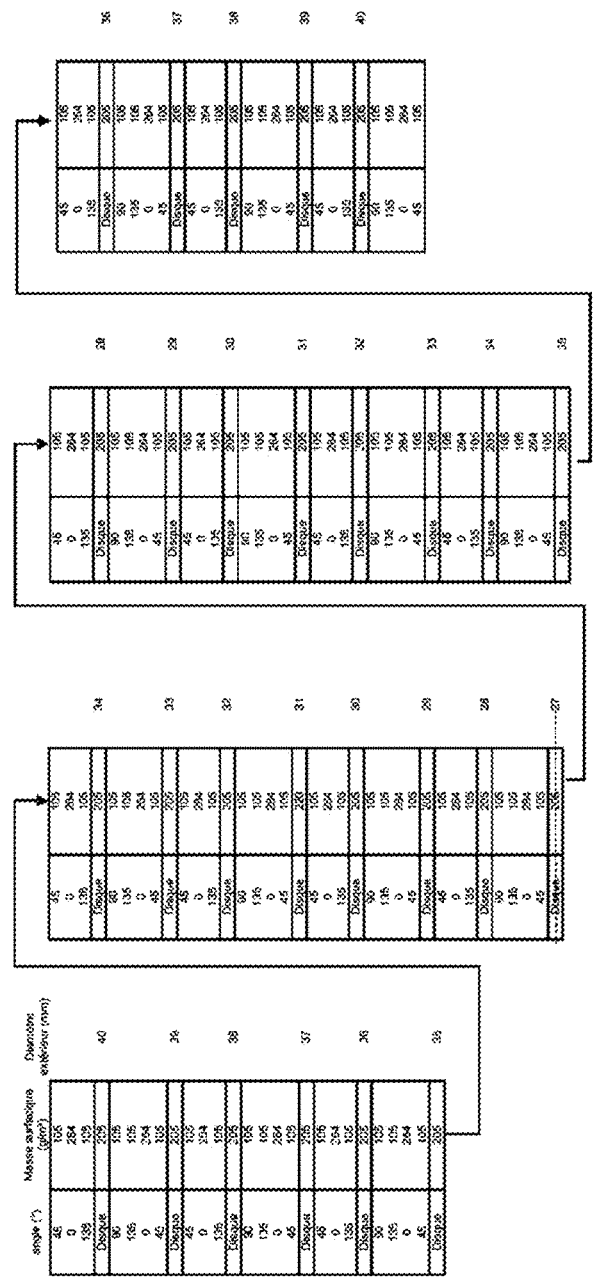
FIG. 12 shows, in tables, the orientation of the discs, the changes in their external diameters, and the stacks created in comparative example C3.

A part conforming to the part represented in FIG. 9A and FIG. 9B is made in accordance with Example 3a) so as to obtain an orientation of fibers of 50/40/10 by replacing the plies of "web of twisted threads" at the two openings 100 and 101 by discs with an internal diameter of 22 mm and changing external diameters as shown in FIG. 12, cut from a fabric web of 205 g/m² Fabric B (taffeta 205 g/m² 3K IHR) E01 2×10 g/m².

The orientation of the discs, the changes in their external diameter, and the created stacks are shown in FIG. 12.

For each of the above examples, the stacking steps are performed in a two-part mold with a form adapted to the part to be made, and the final part is then obtained according to an RTM process by applying the following successive steps:

Before Injection:
    Connecting a vacuum pump to one of the ends of the mold to verify the compactness of the preform in order to discern the preferred resin paths
    Rise in press temperature: 5° C./min Injection
    Injection is accomplished through the stopper on the mold, with a Hexcel RTM6 resin.
    Input pressure: 2.5 bar
    Output vacuum: 5 mbar Firing
    Firing: 2 h 00 at 180° C.

Cooling Before Unmolding:
    Cooling rate: 5° C./min

The final parts obtained have the following characteristics, shown in Table 4.

TABLE 4

| Part | Weight | Change in weight | Fiber volume ratios |
|---|---|---|---|
| Connecting rod bearing made according to the process of the invention | 154 g | −15% | 61% |
| Comparative example C1 | 182 g | Reference | 61% |
| Comparative example C2 | 183 g | +1% | 61% |
| Comparative example C3 | 154 | −15% | 61% |

Figure 13:
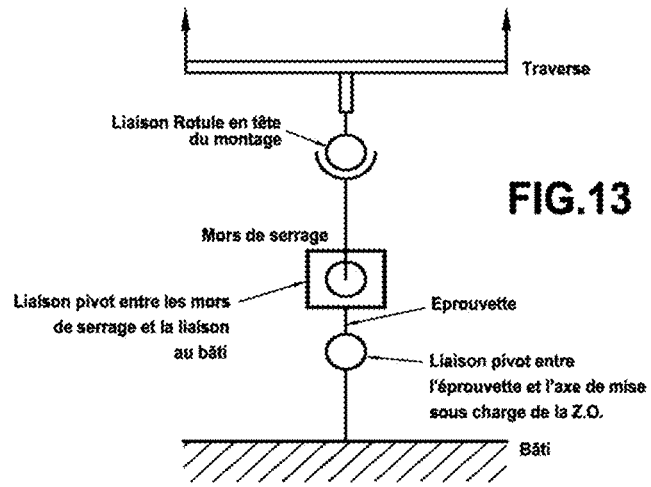
FIG. 13 represents a schematic of a device making it possible to test the mechanical tensile performance of the parts obtained.
Figure 14:
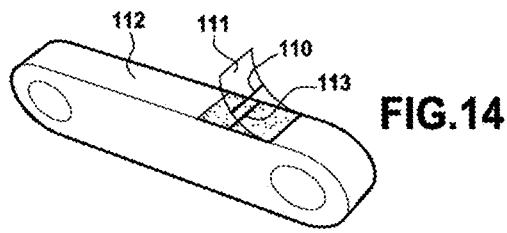
FIGS. 14 and 15 illustrate the preparatory steps for the mechanical tensile tests.
Figure 15:
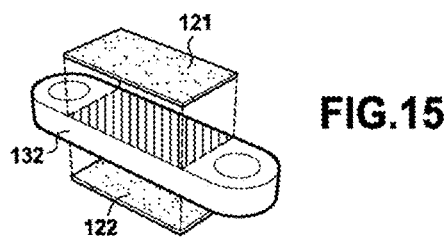

Mechanical tests are performed on each part by positioning the part between two holding jaws linked by screws that enable the part to be held between the two jaws. A tensile load is applied to the part using a device as illustrated in FIG. 13. A reference gauge 110, placed on an indeformable adhesive ribbon 111, is positioned on a lateral edge 112 of the part using an adhesive, so as to coincide with a reference 113 placed directly on the part, as illustrated in FIG. 14. The adhesive ribbon is then removed, the gauge then remaining adhered to the part. Glass claws 121 and 122 are next glued in the center portion of both sides of the part 123, as shown in FIG. 15. The claws serve to keep the center portion of the piece embedded. They are made of glass, reference Hiexcel 914/644. The adhesive is Structil Hysol® EA 9321. The adhesive is polymerized at room temperature for 10 days.

The tests are performed as follows:

Test Conditions
- Dartec 30 T Sensor 10 T
- Deformation data acquisition instrument IIBM Spider 8
- Vishay gauges 062UW 350
- Traverse motion speed: 0.016 mm/s, that is, 0.96 mm/min Process
- Placement of the part in the holding jaw Tightening the 6 screws with a torque of 10 DaN/screw
- Placement of the "holding jaw+part" in the fitting
- Positioning the Dartec traverse to enable the titanium axis joining the Z.O. and the viewing fitting to be put in place
- Setting the deformations of the gauges at zero
- Initiating the tensile test The mechanical results obtained are shown in TABLE 5 below.

TABLE 5

|  | Average load at rupture in KN | Load at rupture relative to comparative ex. C1) | Typical difference in KN | Variation coefficient |
|---|---|---|---|---|
| Comparative ex C1 | 136.5 | / | 3.2 | 2.3% |
| Comparative ex C2 | 134.8 | −1.20% | 9.7 | 7.2% |
| Comparative ex C3 | 127.1 | −6.90% | 12.2 | 9.6% |
| Connecting rod according to the invention | 148.4 | +8.7 | 12 | 8.1% |

Figure 16A:
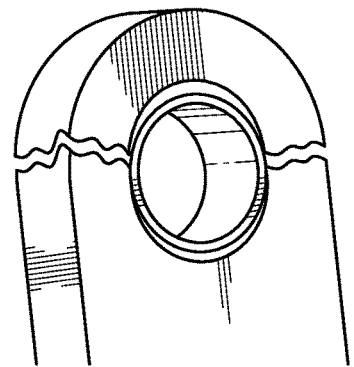
FIGS. 16A and 16B represent, respectively, photos of parts according to comparative example C1 and according to the invention, after the mechanical tensile test.
Figure 16B:
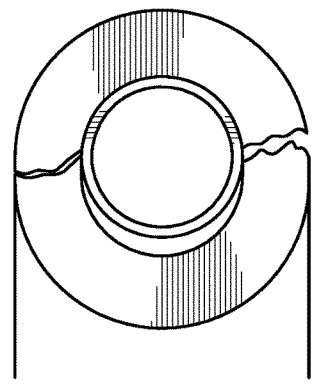

FIGS. 16A and 16B respectively represent photos of parts according to comparative example C1 and according to the invention, after the tensile test.

The mechanical properties of the twisted threads were checked independently of the tensile tests. The tests were conducted according to the standard tests described in TABLE 6, with test specimens prepared from unidirectional pre-impregnates of carbon threads Hexcel IMA GS 12 K, lot no. 3733-6G, at 268 g/m², impregnated with a resin: Hexcel M21E, lot no. 71087-71088. The preimpregnated webs used to make the plates tested were prepared with non-twisted threads and threads twisted at 17 t/m according to the process of the invention.

These webs were stacked then fired according to the recommendations described in the cited standards.

Lot 1 corresponds to the use of non-twisted threads.

Lot 2 corresponds to the use of threads twisted at 17 turns/meter.

TABLE 6 shows the tests performed and the results obtained.

TABLE 6

| Test | T/conditions | Lot | Average | Typical E. % |
|---|---|---|---|---|
| Tensile strength [MPa] | TA/sec | 1 | 100 | 7.4 |
| [0]8, EN 2561 A | TA/sec | 2 | 113 | 2.8 |
| Module in traction [GPa] | TA/sec | 1 | 100 | 1.2 |
| [0]8, EN 2561 A | TA/sec | 2 | 102 | 1.4 |
| Compression strength [MPa] | TA/sec | 1 | 100 | 19.2 |
| [0]8, EN 2850 B | TA/sec | 2 | 104 | 9.0 |
| Module in compression [GPa] | TA/sec | 1 | 100 | 2.7 |
| [0]8, EN 2850 B | TA/sec | 2 | 94 | 1.7 |
| ILSS strength [MPa] | TA/sec | 1 | 100 | 4.2 |
| [0]8, EN 2563 | TA/sec | 2 | 113 | 5.2 |
|  | 120° C./sec | 1 | 100 | 1.1 |
|  | 120° C./sec | 2 | 108 | 3.2 |

The values shown are normalized to fiber volume ratios of 60% and normalized relative to the values obtained in the case of non-twisted threads.

No significant reduction in the mechanical properties was observed when twisting the threads at 17 t/m.

The invention claimed is:

1. A composite part having a curved area in which undulation of filaments in the flat threads that are present in the curved area is prevented, said composite part comprising:
a planar body with an upper surface and a lower surface that extend parallel to each other to define a thickness of said planar body, said planar body having an inner curved border which defines an inner arc having an axis that is perpendicular to the plane of said planar body and an outer curved border which defines an outer concentric arc having an axis that is perpendicular to the plane of said planar body wherein the radial distance between said inner curved border and said outer curved border defines a radial width of said planar body, said planar body comprising:
an inner border flat thread that is located along the inner curved border of said planar body, said inner border flat thread comprising from 3,000 to 24,000 filaments selected from the group consisting of carbon fibers, glass fibers, aramid fibers, silica fibers, ceramic fibers, basalt fibers and mixtures thereof, said inner border flat thread having a length and a longitudinal axis that extends in the lengthwise direction of said inner border flat thread, said inner border flat thread having a thickness and having a width of from 1 mm to 12 mm between a first side of said inner border flat thread and a second side of said inner border flat thread, said inner border flat thread following an inner curved path along said inner curved border, said inner curved path having an inner side located closest to said inner curved border and an outer side, wherein the length of the inner side of said inner curved path along said inner curved border is shorter than the length of the outer side of said inner curved path, said inner curved path being located within the plane of said planar body and wherein said inner border flat thread has been rotated about the longitudinal axis of said inner border flat thread a sufficient number of times over the length of said inner curved path such that undulation of the filaments in said inner border flat thread is prevented;
a flat thread that lies within the plane of said planar body in the same direction adjacent to said inner border flat thread, said flat thread being parallel to said inner border flat thread, said flat thread comprising from 3,000 to 24,000 filaments selected from the group consisting of carbon fibers, glass fibers, aramid fibers, silica fibers, ceramic fibers, basalt fibers and mixtures thereof, said flat thread having a length and a longitudinal axis that extends in the lengthwise direction of said flat thread said flat thread having a thickness and having a width of from 1 mm to 12 mm between a first side of said flat thread and a second side of said flat thread, said flat thread following a curved path adjacent to said inner border flat thread, said curved path having an inner side located closest to said inner border flat thread and an outer side, wherein the length of the inner side of said curved path is shorter than the length of the outer side of said curved path, said curved path being located within the plane of said planar body and wherein said flat thread has been rotated about the longitudinal axis of said flat thread a sufficient number of times over the length of said inner curved path such that undulation of the filaments in said flat thread is prevented; and a polymer matrix comprising an uncured resin.

2. A composite part according to claim 1 wherein said inner curved border forms an inner curved edge of the composite part.

3. A composite part according to claim 2 wherein the inner curved edge defines an opening.

4. A composite part according to claim 1 wherein the number of rotations of said inner border flat thread about the longitudinal axis of said inner border flat thread is from 5 to 100 per meter along said inner curved path.

5. A composite part according to claim 1 wherein the polymer matrix comprises an uncured resin selected from the group consisting of thermosetting polymers, thermoplastic polymers and mixtures of said polymers.

6. A composite part according to claim 1 wherein the percentage by weight of the polymer matrix relative to the total weight of the composite part is within the range of 20 to 60%.

7. A composite part according to claim 1 wherein said inner curved path is a planar spiral path that comprises a beginning at said inner curved border and an ending at said outer curved border and wherein said inner border flat thread is a continuous flat thread that extends from the beginning to the end of said spiral path.

8. A composite part according to claim 1 wherein said planar body comprises:

an outer border flat thread that is located along the outer curved border of said planar body said outer border flat thread comprising from 3,000 to 24,000 filaments selected from the group consisting of carbon fibers, glass fibers, aramid fibers, silica fibers, ceramic fibers, basalt fibers and mixtures thereof, said outer border flat thread having a length and a longitudinal axis that extends in the lengthwise direction of said outer border flat thread, said outer border flat thread having a thickness and having a width of from 1 mm to 12 mm between a first side of said outer border flat thread and a second side of said outer border flat thread, said outer border flat thread following an outer curved path along said outer curved border, said outer curved path having an outer side located closest to said outer curved border and an inner side, wherein the length of the inner side of said outer curved path along said outer curved border is shorter than the length of the outer side of said outer curved path, said outer curved path being located within the plane of said planar body and wherein said outer border flat thread has been rotated about the longitudinal axis of said outer border flat thread a sufficient number of times over the length of said outer curved path such that undulation of the filaments in said outer border flat thread is prevented.

9. A composite part according to claim 8 wherein said outer curved border forms an outer curved edge of the composite part.

10. A composite part according to claim 8 wherein said composite part is in the shape of a frame reinforcement element for a door corner, trap door, manhole or access door, a porthole frame or windshield frame, a bore for assembly, an attachment part or a part comprising a load input area.

11. A composite part according to claim 1 wherein said inner border flat thread comprises 3,000 filaments and wherein the number of rotations of said inner border flat thread about the longitudinal axis of said inner border flat thread is from 15 to 40 per meter along said inner curved path.

12. A composite part according to claim 1 wherein said inner border flat thread comprises 6,000 filaments and wherein the number of rotations of said inner border flat thread about the longitudinal axis of said inner border flat tread is from 40 to 70 per meter along said inner curved path.

13. A composite part according to claim 1 wherein said inner border flat thread comprises 12,000 filaments and wherein the number of rotations of said inner border flat thread about the longitudinal axis of said inner border flat thread is from 10 to 60 per meter along said inner curved path.

14. A composite part according to claim 1 wherein said inner border flat thread comprises 24,000 filaments and wherein the number of rotations of said inner border flat thread about the longitudinal axis of said inner border flat thread is from 10 to 25 per meter along said inner curved path.

15. A composite part according to claim 1 wherein the number of rotations per meter of said inner border flat thread about the longitudinal axis of said inner border flat thread is substantially the same along substantially the entire length of said inner curved path.

16. A composite part according to claim 1 wherein said inner curved border is the arc of circle that lies in the plane of said planar body and which has an inner radius of at least 10 mm and wherein said outer curved border is the arc of a circle that also lies in the plane of said planar body and which has an outer radius no more than 500 mm.

17. A cured composite part comprising a composite part according to claim 1 wherein said uncured resin has been cured.

18. A cured composite part according to claim 17 wherein said inner curved border is an inner curved edge of the composite part that defines an opening in said composite part and wherein said composite part forms part of a connecting rod bearing or rod attachment.

19. A cured composite part comprising a composite part according to claim 17 wherein said 3,000 to 24,000 filaments are carbon fibers.

20. A composite part according to claim 1 wherein said 3,000 to 24,000 filaments are carbon fibers.

* * * * *